US012501868B2

(12) United States Patent
Yan et al.

(10) Patent No.: US 12,501,868 B2
(45) Date of Patent: Dec. 23, 2025

(54) HAPLOID INDUCTION COMPOUNDS AND METHODS FOR USE THEREOF

(71) Applicant: WIMI BIOTECHNOLOGY (HAINAN) CO., LTD., Hainan (CN)

(72) Inventors: Jianbing Yan, Wuhan (CN); Xiang Li, Wuhan (CN); Chenglin Jiang, Wuhan (CN)

(73) Assignee: WIMI BIOTECHNOLOGY (HAINAN) CO., LTD., Sanya (CN)

( * ) Notice: Subject to any disclaimer, the term of this patent is extended or adjusted under 35 U.S.C. 154(b) by 351 days.

(21) Appl. No.: 17/931,087

(22) Filed: Sep. 9, 2022

(65) Prior Publication Data

US 2023/0050888 A1  Feb. 16, 2023

Related U.S. Application Data

(63) Continuation-in-part of application No. PCT/CN2021/072466, filed on Jan. 18, 2021.

(30) Foreign Application Priority Data

Mar. 10, 2020 (CN) .......................... 202010162970.7

(51) Int. Cl.
| | |
|---|---|
| A01H 5/10 | (2018.01) |
| A01H 1/00 | (2006.01) |
| A01H 1/06 | (2006.01) |
| A01H 1/08 | (2006.01) |
| C07K 14/42 | (2006.01) |
| C07K 14/81 | (2006.01) |

(52) U.S. Cl.
CPC ................ *A01H 1/08* (2013.01); *A01H 1/00* (2013.01); *A01H 1/06* (2013.01); *C07K 14/42* (2013.01); *C07K 14/81* (2013.01)

(58) Field of Classification Search
None
See application file for complete search history.

(56) References Cited

U.S. PATENT DOCUMENTS

| 2017/0143675 A1 | 5/2017 | Mor | |
| 2018/0332790 A1* | 11/2018 | Kelliher | ............... A01H 1/08 |

FOREIGN PATENT DOCUMENTS

| CN | 101394856 A | 3/2009 |
| CN | 103191465 A | 7/2013 |
| CN | 104604674 A | 5/2015 |
| CN | 110037011 A | 7/2019 |
| CN | 111264385 A | 6/2020 |

OTHER PUBLICATIONS

Avanti Polar Lipids, Nov. 15, 2018, Product name : 1,2-dioleoyl-sn-glycero-3-phosphocholine, Product No. 850375C, (Year: 2018).*
Rao A., Germination of compound pollen grains, Sep. 1, 2009, Taylor & Francis, Grana, 12(2), 113-120. (Year: 1972).*
Zhang, Jue-Rong, et al. (HPLC-chemiluminescence and thermospray LC/MS study of hydroperoxides generated from phosphatidylcholine. Free Radical Biology and Medicine, vol. 18, No. 1, Jan. 1995, pp. 1-10 (Year: 1995).*
Dong X et al., Fine Mapping of Qhir1 Influencing in Vivo Haploid Induction in Maize, Theoretical & Applied Genetics, 126(7): 1713-1720, 2013.
Xu, Yanxia, Application of the Stock6 in the Breeding of Maize Inbred Lines, Heilongjiang Agricultural Sciences, 11: 157-159, 2014.
Vanessa Prigge et al., New Insights into the Genetics of in Vivo Induction of Maternal Haploids, the Backbone of Doubled Haploid Technology in Maize, Genetics, 190(2): 781-793, 2012.
Chenxu Liu et al., Mapping of qhir8 Affecting in Vivo Haploid Induction in Maize, Theoretical and Applied Genetics, 128(12): 2507-2515, 2015.
Chenxu Liu et al., A 4-bp Insertion at ZmPLA1 Encoding a Putative Phospholipase a Generates Haploid Induction in Maize, Molecular Plant, 10(3): 520-522, 2017.
Timothy Kelliher et al., Matrilineal, a Sperm-Specific Phospholipase, Triggers Maize Haploid Induction, Nature, 542(7639): 105-109, 2017.
Laurine M Gilles et al., Loss of Pollen-Specific Phospholipase Not Like Dad Triggers Gynogenesis in Maize, The EMBO Journal, 36(6): 707-717, 2017.
Patrik Poprac et al., Targeting Free Radicals in Oxidative Stress-Related Human Diseases, Trends in Pharmacological Sciences, 38(7): 592-607, 2017.
Xiang Li et al., Single Nucleus Sequencing Returns Spermatized Chromosomal Fragmentation as a Possible Cause of Maize Haploid Induction, Nature Communications, 8 (1): 991:1-991:9, 2017.
H. Ambrus et al., In Vitro Microspore Selection in Maize Anther Culture with Oxidative-stress Stimulators, Protoplasma, 228: 87-94, 2006.
Li, Xiang, Single Cell Sequencing Dissects Meiotic Recombination and Haploid Induction in Maize, China Doctoral Dissertations Full-text Database Agricultural Science and Technology Section, 2017, 132 pages.
Liu, Zhixian et al., Studies on Identification of Induced Haploid Material and Techniques for Rapidly Creating Inbred Lines in Maize, Journal of Maize Sciences, 16(3): 12-14,18, 2008.
Bu Huahu et al., Research Advances in Haploid Breeding of Plants, Journal of Shanxi Agriculture Sciences, 45(12): 2032-2037, 2017.
Buayishame Namanti, Analysis of Common Identification Methods for Maize Haploid, Xiangcunkeji, 2017, 3 pages.

(Continued)

*Primary Examiner* — Weihua Fan
*Assistant Examiner* — Christian Jose Ordaz
(74) *Attorney, Agent, or Firm* — METIS IP LLC

(57) ABSTRACT

A method for selecting a compound of haploid induction is provided. The method includes: treating a reproductive tissue of a plant with a reagent containing compounds to be tested; detecting a reactive oxygen species (ROS) level in the reproductive tissue after the treatment; and determining a compound that leads to an increase of the ROS level as the compound.

11 Claims, 4 Drawing Sheets

(56) References Cited

OTHER PUBLICATIONS

International Search Report in PCT/CN2021/072466 mailed on Apr. 22, 2021, 8 pages.
Written Opinion in PCT/CN2021/072466 mailed on Apr. 21, 2021, 10 pages.
First Office Action in Chinese Application No. 202010162970.7 mailed on Apr. 23, 2021, 11 pages.

\* cited by examiner

A

HAPLOID INDUCTION COMPOUNDS AND METHODS FOR USE THEREOF

CROSS-REFERENCE TO RELATED APPLICATION

This application is continuation-in-part of PCT/CN2021/072466, filed on Jan. 18, 2021, which claims priority of Chinese Patent Application No. 202010162970.7 filed on Mar. 10, 2020, the entire contents of which are hereby incorporated by reference.

TECHNICAL FIELD

The present disclosure is related to the field of plant biotechnology, specifically agriculture biotechnology and plant breeding. The presently disclosed subject matter relates to a method for selecting compound that can produce haploid plant seeds.

BACKGROUND

Haploid is of great importance to plant breeding. It generally takes two years to get homozygous inbred line by doubled haploid (DH) breeding, which shortens the breeding cycle by 3-5 years compared with conventional methods. DH breeding has higher selection efficiency and is conducive to the accurate selecting of recessive mutants. In addition, haploid technology is also widely used in the purification and rejuvenation of inbred lines, the creation of genetic materials, and the applied research of plant quantitative genetics.

In haploid breeding, the application of haploid breeding technology in maize is the most successful, which is mainly due to the application of natural maize high-frequency haploid induction line Stock 6, etc. When Stock 6 is used as the male parent, it can form haploids that only retain the genome of the female parent. Combined with R1-nj color markers, the efficiency of haploid selection is greatly improved. Through decades of genetic improvement, induction lines with an induction rate of 10-12% have been very common (Dong X, Xu X, Miao J, et al. Fine Mapping of qhir1 Influencing in Vivo Haploid Induction in Maize[J]. Theoretical & Applied Genetics, 2013, 126(7): 1713-1720.). Obtaining DH pure lines through inducer lines is the most economically method in conventional breeding of maize. The United States is the birthplace of maize DH technology. At present, about 60% of dent type inbred lines and 30% of hard grain inbred lines abroad are bred by DH technology (Xun Yanxia. Application of the Stock6 in the Breeding of Maize Inbred Lines[J]. Heilongjiang Agricultural Sciences, 2014, (11): 157~159). Therefore, the development and application of haploid inducer are of great significance in plant genetic breeding. However, the germplasm with natural inducer function are limited. And it is also very difficult to cultivate inducer lines through traditional breeding. In addition, because there is no natural inducer line like Stock 6, it is even more difficult to cultivate inducer lines artificially in plants except maize.

Previous studies have confirmed that the induction ability of haploid inducer line Stock 6 is controlled by multiple quantitative trait loci, of which two major QTLs, qhir1 and qhir8, can respectively explain 66% and 20% of the phenotypic variation (Prigge V, Xu X, Li L, et al. New insights into the genetics of in vivo induction of maternal haploids, the backbone of doubled haploid technology in maize[J]. Genetics, 2012, 190(2): 781-93.). While qhir8 is precisely located in a range of 780 kb (Liu C, Li W, Zhong Y, et al. Fine Mapping of qhir8 Affecting in Vivo Haploid Induction in Maize[J]. Theoretical and Applied Genetics, 2015, 128(12): 2507-2515.); and qhir1 has also been precisely located and cloned, and the functional gene is ZmPLA1/MATL/NLD (Liu C, Li X, Meng D, et al. A 4-bp Insertion at ZmPLA1 Encoding a Putative Phospholipase a Generates Haploid Induction in Maize[J]. Mol Plant, 2017, 10(3): 520-522; Kelliher T, Starr D, Richbourg L, et al. MATRILINEAL, a sperm-specific phospholipase, triggers maize haploid induction[J]. Nature, 2017, 542(7639): 105-109; Gilles L M, Khaled A, Laffaire, J B, et al. Loss of pollen-specific phospholipase NOT LIKE DAD triggers gynogenesis in maize[J]. The EMBO Journal, 2017, 36(6): 707-717.). Mutations in ZmPLA1/MATL/NLD) encoding a phospholipase can cause sperm cell DNA breakage and generate maternal haploids. But the reason is not very clear.

Artificially mutating ZmPLA1/MATL/NLD) or crossing haploid induction lines can create new haploid inducer, but requires specific molecular technology and long-term breeding (including the selecting of mutant genotypes and other agronomic characteristics), and the haploid induction rate (HIR) is still very low.

In addition, specific chemically treating plant can also induce haploid. For example, trifluralin, amiprophosmethyl, propyzamide, colchicine, etc. can be used to induce parthenogenesis for haploids (TEYIJIA Maize Technology Co., Ltd. A Method of Chemically Induced Parthenogenesis in Maize: CN201410405168.0 [P]. 2015 May 13.). Or by treating plant reproductive tissues with lipid compound, phospholipase inhibitors or fatty acid desaturase inhibitors to induce haploid by inhibiting the phospholipase encoded by ZmPLA1/MATL/NLD). However, such above compounds perform poorly in induction rate. Among them, the most efficient chemical inducer, MALFP, only has an induction rate of 8.9% (Syngenta Group. Haploid Induction Composition and its Application: CN201680067447.8 [P]. 2018 Dec. 21.). Moreover, these disclosed chemical compounds also have defects such as high cost, difficult mixture, toxic and harmful to the environment.

The mechanism of haploid formation is yet to be found, which is the key for efficient high-rate compound discovery. In order to solve the above problems, the present disclosure deeply analyzes haploid plants in transcriptome and proteomics levels, and finds that the reactive oxygen species (ROS) burst is the key reason for sperm cell DNA break and haploid formation. Therefore, all subject matters that can promote the increase of ROS in reproductive tissues have the potential to become haploid chemical inducers. Based on such idea, the present disclosure provides a new method for creating haploid induction, obtains a more efficient haploid chemical inducer, and develops a method for chemically treating plants to induce haploids.

SUMMARY

The presently invention-disclosed subject matter relates to a method for selecting a compound of haploid induction. The method includes: treating a reproductive tissue of a plant with a reagent containing compounds to be tested; detecting a reactive oxygen species (ROS) level in the reproductive tissue after the treatment; and determining a compound that leads to an increase of the ROS level as the compound of haploid induction.

In certain embodiments, the plant includes crops, the crops can include at least one of maize, cotton, rice, rape, sorghum, wheat and citrus.

In certain embodiments, the reproductive tissue can include pollen.

In certain embodiments, the ROS level is detected by a fluorescence method.

Additionally, the present disclosure also provides a compound for haploid induction. In certain embodiments, the compound is a compound capable of increasing a reactive oxygen species (ROS) level in a reproductive tissue of a plant.

In certain embodiments, the compound is selected from one or more of the compounds 1-16 listed in Table 5. In certain embodiments, the compound is lecithin, methimazole or a combination thereof.

The present disclosure further provides a haploid-inducing reagent. In certain embodiments, the haploid-inducing reagent comprises a compound capable of increasing a reactive oxygen species (ROS) level in a reproductive tissue of a plant and a formulation, wherein the compound is dissolved or emulsified in the formulation.

In certain embodiments, the compound is selected from one or more of the compounds 1-16 listed in Table 5. In certain embodiments, the compound includes inhibitors of active oxygen degradation pathway enzymes (peroxidase inhibitor methimazole), active oxygen inducers (diphenyleneiodonium chloride, DPI), signal pathways (such as calcium chloride ($CaCl_2$)), calcium nitrate ($Ca(NO_3)_2$), cyclic Adenosine Monophosphate Camp (cAMP), inositol triphosphate ($IP_3(1,3,4)$), 1,2-Octadecyl Phosphatidylinositol Di-4,5-Phosphate (PI(4,5)PP_18:1)), compounds relating to cytoskeleton stability (Jasplakinolide, Cucurbitacin e, B Latrunculin B, A Latrunculin A, Blebbistatin), compounds relating to lecithin balance (Lecithin PC_18:1, Lecithin Specific Phospholipase C D609, Choline Phosphate CP, Phospholipase D Inhibitor FIPI).

In certain embodiments, the compound includes lecithin, methimazole or a combination thereof.

In certain embodiments, the formulation comprises paraffin oil or 20%-40% sucrose solution.

In certain embodiments, the haploid-inducing reagent is lecithin dissolved in the formulation at a concentration of 0.05-5 mg/ml.

In certain embodiments, the haploid-inducing reagent is lecithin dissolved in the formulation at a concentration of 0.8-4 mg/ml.

In certain embodiments, the haploid-inducing reagent is lecithin dissolved in the formulation at a concentration of 0.8 mg/ml.

In certain embodiments, the haploid-inducing reagent is methimazole dissolved in the formulation at a concentration of less than 0.16 mg/ml.

In certain embodiments, the haploid-inducing reagent is a reagent prepared from that a suspension at 0.8 mg/ml prepared by methimazole and paraffin oil is centrifugated, a supernatant after centrifugation is dissolved in paraffin oil at a concentration of 5-fold dilution.

In certain embodiments, the plant includes crops, the crops can include at least one of maize, cotton, rice, rape, sorghum, wheat and citrus.

In certain embodiments, the plant is maize.

The present disclosure further provides a method for inducing haploid seed production of a plant. The method includes: treating a reproductive tissue of a plant with the haploid-inducing reagent, wherein the treatment occurs immediately preceding, during or immediately following pollination, and at least one haploid seed is produced.

In certain embodiments, the plant includes crops, the crops include at least one of maize, cotton, rice, rape, sorghum, wheat and citrus.

The advantages and beneficial effect of the present disclosure are as follows:

Based on the relation between haploid induction and ROS level, a new efficient method of selecting haploid-inducing reagent is developed.

Based on the above method, a plurality of potential efficient haploid-inducing reagents (e.g., the compounds in Table 5) are found. For example, lecithin reagent dissolved in paraffin oil at a concentration of 0.8-4 mg/ml or methimazole reagent dissolved in paraffin oil at a concentration of less than 0.16 mg/ml can induce haploid effectively.

Lecithin reagent dissolved in paraffin oil at a concentration of 0.8-4 mg/ml can be served as a haploid-inducing reagent for maize and other plants in large scale due to its low cost, high efficiency, harmlessness and easily preparation.

Based on the above haploid-inducing reagents, a method of inducing haploid is developed, which is of high efficiency and easily operation, does not require specific apparatus and can be applied in large scale.

BRIEF DESCRIPTION OF THE DRAWINGS

The present disclosure is further illustrated in terms of exemplary embodiments. These exemplary embodiments are described in detail with reference to the drawings. These embodiments are not limited, in these embodiments, the same number denote the same structure, with.

DETAILED DESCRIPTION

Figure 1:
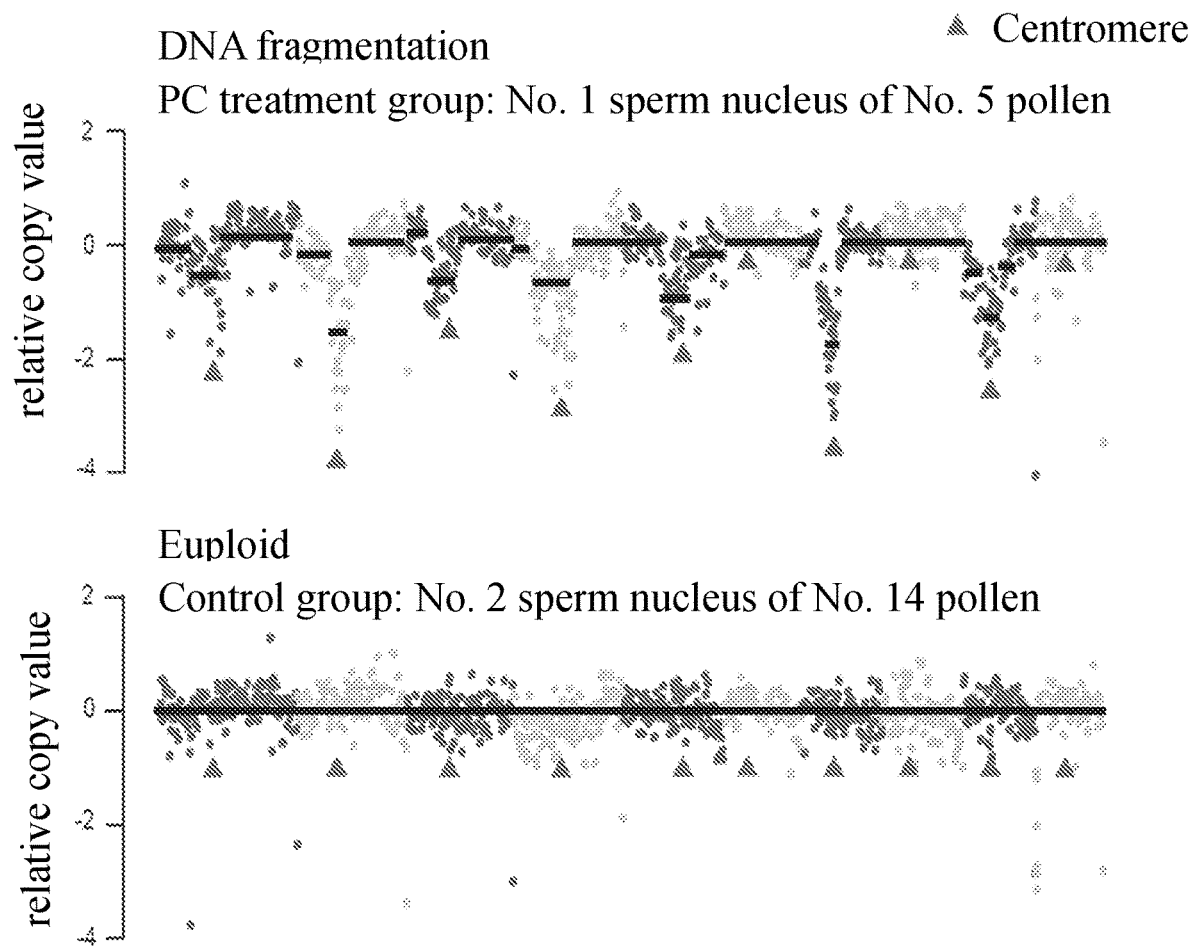
FIG. 1 illustrates DNA sequencing results of lecithin-treated (above) and untreated (below) sperm cells; the horizontal axis represents the location of chromosomes (dark dots and light dots represent odd and even chromosomes, respectively), and the vertical axis represents the degree of fragmentation. The black line indicates the average fragmentation degree.

The following definitions and methods are provided to better define this application and guide ordinary technicians in the practice of this application. Unless otherwise stated, the terms are understood in accordance with the normal usage of ordinary technicians in the relevant fields. All invention documents, academic papers, industry standards and other public publications cited in the present disclosure are incorporated into the present disclosure for reference.

As used herein, "maize" is any maize plant and includes all plant varieties that can be crossed with maize, including whole plants, cells, organs, protoplasts, cell tissue cultures from which plants can regenerate, callus, complete cells in plants or its parts, such as reproductives, pollen, ovules, seeds, leaves, flowers, branches, fruits, stems, root tips, anthers, etc. "Plant" includes the indexing of the whole plant, organs, tissues, seeds, cells and their descendants. "Cells" include, but are not limited to, cells from seeds, suspension cultures, germs, meristematic regions, calli, leaves, roots, seedlings, gametophytes, sporophytes, pollen, and microspores. "Offspring" refers to any subsequent generations of the plant.

In the present disclosure, the words "include" or variants thereof shall be understood to include other elements, figures or steps in addition to the elements, figures or steps described.

Unless otherwise specified, all figures used in the present disclosure indicating the amount of ingredients, reaction conditions, etc. shall be understood as being modified by the term "approximate" in all cases. As used herein, the term "approximate", when referring to a measurable value such as a quantity of mass, weight, time, volume, concentration, or percentage, means that it covers a change of ±20% compared with the specified quantity in certain embodiments, a change of ±10% compared with the specified quantity in certain embodiments, a change of ±5% compared with the specified quantity in certain embodiments, a change of ±1% compared with the specified quantity in certain embodiments, a change of ±0.5% compared with the specified amount, and in certain embodiments, a change of ±0.1% compared with the specified amount since such changes are suitable for performing the disclosed method and/or using the disclosed composition, nucleic acid, polypeptide, etc. Therefore, unless otherwise specified, the parameters listed in the present disclosure are approximate values that can vary depending on the expected characteristics that are attempted to be obtained through the subject matter disclosed in the present disclosure.

The following examples are used to illustrate the present disclosure, but are not used to limit its scope. Based on its essential, any modification or replacement of its method, steps or conditions of the present disclosure is within the protection scope. Unless otherwise specified, the examples follow the conventional experimental conditions, such as Molecular Cloning: a laboratory manual (Sambrook J & Russell D W, 2001), or the conditions recommended in the manufacturer's instructions. Unless otherwise specified, the chemical reagents used in the examples are conventional commercial reagents, and the technical means used in the examples are conventional methods well known to those skilled in the art.

One aspect of the present disclosure provides a method for selecting a compound that induces haploid, which comprises treating the reproductive tissue of a plant with a reagent containing a compound to be tested, detecting the ROS level in the reproductive tissue after the treatment, and determining a compound with an increased ROS level as a compound that induces haploid. In some embodiments, the plant includes at least one of maize, cotton, rice, rape, sorghum, wheat and citrus. In some embodiments, the reproductive tissue comprises pollen. ROS level can be detected by various methods, for example, electron paramagnetism, resonance spectroscopy and enzymatic analysis. In some embodiments, the ROS level may be detected by fluorescence. Specifically, the ROS level was detected using the ROS detection kit (fluorescence method, mak144, sigma). In some embodiments, the formulation may comprise a paraffin oil or a 40% sucrose solution. In some embodiments, the compound is selected from one or more of compounds 1-16 listed in Table 5. In some embodiments, the compound may be lecithin, methimazole, or a combination thereof.

Another aspect of the present disclosure provides a compound for haploid induction. In some embodiments, the compound is a compound capable of increasing the ROS level of reproductive tissues in plant. In some embodiments, the compound is selected from one or more of compounds 1-16 listed in Table 5. In some embodiments, the compound may be lecithin, methimazole, or a combination thereof.

Another aspect of the present disclosure provides a haploid-inducing reagent. In some embodiments, the haploid-inducing reagent may include compounds and formulations capable of increasing the ROS level of reproductive tissues of a plant. In some embodiments, the compound may be dissolved or emulsified in the formulation. In some embodiments, the compound in the haploid-inducing reagent is selected from one or more of compounds 1-16 listed in Table 5. In some embodiments, the compound in the haploid-inducing reagent may be lecithin, methimazole, or a combination thereof. In some embodiments, the formulation in the haploid inducer may include paraffin oil or a 20%-40% sucrose solution. In some embodiments, the haploid-inducing reagent may be lecithin dissolved in the formulation at a concentration of 0.05-5 mg/ml. In some embodiments, the haploid-inducing reagent may be lecithin dissolved in the formulation at a concentration of 0.8-4 mg/ml. In some embodiments, the haploid-induced reagent may be lecithin dissolved in the formulation at a concentration of 0.8 mg/ml. In some embodiments, the haploid-inducing reagent may be methimazole dissolved in the formulation at a concentration of less than 0.16 mg/ml. In some embodiments, the haploid-inducing reagent is a reagent prepared from that a suspension at 0.8 mg/ml prepared by methimazole and paraffin oil is centrifugated, a supernatant after centrifugation is dissolved in paraffin oil at a concentration of 5-fold dilution.

Another aspect of the present disclosure provides a method for inducing haploid seed production of a plant, comprising treating the reproductive tissue of a plant with the haploid-inducing reagent, wherein the treatment occurs immediately preceding, during or immediately following pollination, and wherein at least one haploid seed is produced. In some embodiments, the plant includes at least one of maize, cotton, rice, rape, sorghum, wheat and citrus.

EXAMPLES

In view of the foregoing, those of skill in the art should appreciate that changes can be made in the specific aspects which are disclosed and still obtain a like or similar result without departing from the spirit and scope of the present disclosure. Thus, specific structural and functional details disclosed herein are not to be interpreted as limiting. It should be understood that the entire disclosure of each reference cited herein is incorporated within the disclosure of this application.

Example 1. Analysis of Direct Causes and Mechanisms of Haploid Production

The present disclosure uses haploid and diploid materials of maize to analyze the direct causes and mechanisms of haploid production. Deep analysis is made at the transcriptome and proteome levels, so that the differential genes or proteins between materials can be found. Besides, the biochemical reactions related to haploid formation is revealed through cluster analysis.

a. Transcriptome Analysis

In order to study the causes and mechanisms of haploid production, the present disclosure uses maize to analyze the transcriptome differences between pollens of B73 inbred line and B73-inducer line. The inducer line is obtained from Chen Shaojiang's team of China Agricultural University, with 80% of B73 context (Liu C, Li X, Meng D, et al. A 4-bp Insertion at ZmPLA1 Encoding a Putative Phospholipase a Generates Haploid Induction in Maize[J]. Mol Plant, 2017, 10(3): 520-522.). The result indicates that B73 inbred line and B73-inducer line have 22,701 expressed genes, while 1,359 of them have expressed differences between B73 inbred line and B73-inducer line. The result suggests that those genes are related to haploid induction and production.

b. Proteome Analysis

Additionally, to dissect why loss of ZmPLA1 function could mediate HI, we performed a comprehensive multiple omics analysis of zmpla1 mutant (artificially made, refers to Liu C, Li X, Meng D, et al. A 4-bp Insertion at ZmPLA1 Encoding a Putative Phospholipase a Generates Haploid Induction in Maize[J]. Mol Plant, 2017, 10(3): 520-522.) anthers by integrating transcriptome, quantitative proteome, and protein modification (such as phosphorylation or crotonylation) data.

Pollen samples in mutant and wild-type, each of which has three biological replicates, were subjected to protein extraction (urea method), trypsin digestion and Tandem mass tag (TMT) labeling. After six samples are mixed, Liquid Chromatograph Mass Spectrometer (LC-MS) is used for quantitation of protein group one; after S/T phosphorylation affinity enrichment for the samples, LC-MS is used to quantify the protein phosphorylation group two; after crotonylation antibody enrichment, LC-MS is used to quantify the protein crotonylation group three. The specific steps are as follows.

(a) Protein Extraction

The samples are stored at −80° C. When conducting protein extraction, some samples are grinded into powder in a precooled mortar with liquid nitrogen. Then they are mixed with cracking buffer (8 M urea, 1% Triton X-100, 10 mm dithiothreitol, 1% protease inhibitor, 3 µM TSA, 50 mm Nam) that are four times the volume of the powder, and are treated by ultrasonic splitter. The samples are restored at 4° C., and is centrifuged at 20,000 g for 10 minutes. The supernatant is taken, trichloroacetic acid with a concentration of 20% is added into the supernatant for standing at 4° C. for two hours. The mixture is centrifuged at 12,000 g for 3 minutes, Remove the supernatant is removed and the precipitate is washed with precooled acetone three times. Finally, the washed precipitate is dissolved with 8M of urea, and the protein concentration is determined with BCA kit.

(b) Trypsinolysis

Dithiothreitol is added to the protein solution to make the protein solution at the concentration of 5 mM. Then it is reduced at 56° C. for 30 minutes. Iodoacetamide is added to the solution to make the final concentration at 11 mM, and the solution is incubated at room temperature in dark condition for 15 minutes. Finally, the urea concentration of the sample is diluted to make the concentration less than 2 M. Trypsin is added to the solution in a mass ratio of 1:50 (trypsin:protein) and enzymolysis is carried out overnight at 37° C. Then, trypsin is added again in the mass ratio of 1:100 (trypsin:protein) to continue perform enzymatic hydrolysis for 4 hours.

(c) Peptide TMT Labelling

The peptides hydrolyzed by trypsin are desalted with Strata X C18 (Phenomenex) and then freeze-dried in vacuum. The peptide is dissolved with 0.5 M TEAB and the peptide is labeled according to the instructions of the TMT kit. The steps include: thawing the labeled reagent, dissolving it with acetonitrile, mixing it with peptide segments for incubation at room temperature for 2 hours, desalting the labeled peptide segments after mixing, and freeze drying them in vacuum. TMT labelled information of each sample are shown in Table 1.

TABLE 1

TMT labelled information of each sample

| Item | TMT labelling |
| --- | --- |
| WT-1 | 126 |
| WT-2 | 127 |
| WT-3 | 128 |
| Zmpla1-1 | 129 |
| Zmpla1-2 | 130 |
| Zmpla1-3 | 131 |

(d) Modification & Enrichment (Only for Protein Phosphorylation Group and Protein Crotonylation Group)

Phosphorylation Enrichment

The peptide segment is dissolved in the enrichment buffer solution (50% acetonitrile or 6% trifluoroacetic acid), the supernatant is transferred to the IMAC material washed in advance, and placed on a rotating shaker for incubation with gentle shaking. After incubation, the resin is washed three times with buffer solution which is 50% acetonitrile or 6% trifluoroacetic acid and 30% acetonitrile or 0.1% trifluoroacetic acid. Finally, the phosphate peptide is eluted with 10% ammonia water, and the eluent is collected and vacuum lyophilized. Then, desalting is carried out according to the instructions of C18 Zip Tips after being pumped dry, and liquid chromatography-mass spectrometry analysis is carried out after vacuum lyophilization.

Crotonylation Enrichment

The peptide segments are dissolved in IP buffer solution (100 mM NaCl, 1 mM EDTA, 50 mM Tris-HCl, 0.5% NP-40, pH 8.0), then divided into two equal parts, each of which is enriched twice with different batches of crotonylated resin. Move the supernatant to the crotonylated resin (Antibody Resin PTM-503, PTM Biolabs, Hangzhou, CHINA) that are washed in advance, and placed on a rotation shaker at 4° C. for incubation with gentle shaking. After incubation, the resin is washed with IP buffer solution for 4 times and deionized water for 2 times. Finally, 0.1% trifluoroacetic acid eluent is used to elute peptide segment bound to the resin for three times. The eluent is collected and vacuum lyophilized. Then, desalting is carried out according to the instructions of C18 Zip Tips, and liquid chromatography-mass spectrometry analysis is carried out after vacuum lyophilization.

(e) LC-MS Analysis

The peptide segments are dissolved by liquid chromatography mobile phase A and separated by EASY-nLC 1200 Ultra Performance Liquid Chromatography (UPLC) system. Mobile phase A is an aqueous solution containing 0.1% formic acid and 2% acetonitrile. Mobile phase B is an aqueous solution containing 0.1% formic acid and 90% acetonitrile. The condition is set as: 0~38 minutes, 8%-23% B; 38~52 minutes, 23%-35% B; 52~56 minutes, 35%-80% B; 56-60 minutes, 80% B, flow rate maintained at 700 nL/minutes.

After being separated by the UPLC system, the peptide segments are injected into NSI ion source for ionization, and then analyzed by Q Exactive™ HF-X mass spectrometry. The ion source voltage is 2.0 kV, and the peptide parent ions and their secondary fragments are detected and analyzed by high-resolution Orbitrap. The scanning range of primary mass spectrometry is set to 350-1,600 m/z, and the scanning resolution is set to 60,000. The scanning range of secondary mass spectrometry is fixed at 100 m/z, and the scanning resolution of Orbitrap is 30,000. The data acquisition mode used the Data Dependent Scanning program, e.g., after the primary scanning, selecting the parent ions of the top 20 peptide segments with the highest signal intensity to enter the HCD collision pool in turn, using 28% of the fragmentation energy for fragmentation, and conducting secondary mass spectrometry analysis in turn. In order to improve the effective utilization of mass spectrometry, Automatic Gain Control (AGC) is set to 1E5, the signal threshold is set to 50000 ions/s, the maximum injection time is set to 100 ms, and the dynamic exclusion time of tandem mass spectrometry scanning is set to 15 seconds to avoid repeated scanning of parent ions.

(f) Database Retrieving

The secondary mass spectrometry data are retrieved using Maxquant (v1.5.2.8). Parameter setting are as follows: the database is UniProt *Zea mays* (99,369 sequences), an antilibrary is added to calculate the false discovery rate (FDR) caused by random matching, and a common contaminated library is added to the database to eliminate the influence of contaminated proteins in the identification results. The enzyme digestion mode is set to Trypsin/P. The number of missing bits is set to 4. The minimum length of the peptide segments is set to 7 amino acid residues. The maximum number of modifications for peptide segments is set to 5. The mass error tolerance of primary parent ions of First search and Main search are set to 20 ppm and 5 ppm respectively, and the mass error tolerance of secondary fragment ions is 0.02 Da. Cysteine alkylation is set as fixed modification, and variable modification is methionine oxidation, protein N-terminal acetylation, and lysine crotonylation. The quantitative method is set to TMT-6plex, and the FDR for protein identification and PSM identification are set to 1%.

For protein cysteine residue oxidation omics data, protein extraction (phenol extraction), C sulfhydryl blocking, reduced oxidized sulfhydryl, and IodoTMT labeling are performed on three biological repeats of mutant and wild-type. The six samples are mixed, Trypsin Hydrolysis and TMT affinity enrichment are conducted for the samples, LC-MS is performed to detect the oxidized group 4 for quantitative protein. The method is as follows:

The samples are stored at −80° C. and grinded into powder in a precooled mortar with liquid nitrogen. The samples of each group are added with phenol extraction buffer (containing 1% protease inhibitor, 25 mM IAA, 2 mM EDTA), the amount of which is 4 times the volume of powder. After ultrasonic cracking, iodoacetamide (IAA) is added to make the final concentration of 25 mm, and incubated at room temperature in the dark for 45 minutes. An equal volume of Tris balanced phenol is added, and centrifuged at 4° C. 5,500 g for 10 minutes, the supernatant is taken and 0.1 M ammonium acetate/methanol with the amount of 5 times the volume of the supernatant is added to the supernatant for precipitation overnight, and the protein precipitation is washed with methanol and acetone respectively. Finally, the precipitation is redissolved with HES buffer (50 mm HEPES pH 8.0, 1 mm EDTA, 0.2% SDS), and the protein concentration is determined with BCA kit.

100 μg of the samples is weighted and filled with HES buffer until the volume is consistent. And then the protein is labeled according to the operation instructions of IodoTMT kit. The steps are the same as above and the marking information of each sample is the same as above.

Protein precipitation is dispersed with 100 mm ammonium bicarbonate. Trypsin is added to the precipitation in a mass ratio of 1:50 (Trypsin:protein) for enzymatic hydrolysis overnight at 37° C. Dithiothreitol is added to make its final concentration 5 mM for reduction at 56° C. for 30 minutes. After that, iodoacetamide is added to make the final concentration of 11 mM, and incubated at room temperature in the dark for 15 minutes. Then Trypsin is added in the mass ratio of 1:100 (Trypsin:protein) for second enzymatic hydrolysis for 4 hours. The peptides hydrolyzed by trypsin are desalted and freeze-dried in vacuum.

The peptide segments are classified by high pH reverse HPLC, and the chromatographic column is Agilent 300 Extend C18 (5 μm in particle size, 4.6 mm in inner diameter, 250 mm in length). The operations are as follows: the peptide grading gradient is 8%-32% acetonitrile, pH is 9.0, 60 components are separated in 60 minutes, then the peptide segments are combined into 4 components, and the combined components are freeze-dried in vacuum for subsequent operations, the peptide segments are dissolved in IP buffer solution (100 mM NaCl, 1 mm EDTA, 50 mM Tris-HCl, 0.5% NP-40, pH 8.0), the supernatant is transferred to Anti-TMT Antibody resin washed in advance (antibody resin product No. prod #90076, Thermo), and placed on a shaker at 4° C. for incubation overnight with gentle shaking. After incubation, the resin is washed with IP buffer solution for four times and deionized water for two times. Finally, 0.1% trifluoroacetic acid eluent is used to elute peptide segments bound to the resin for three times. The eluent is collected and freeze-dried in vacuum. Desalting is carried out according to the instructions of C18 Zip Tips, and liquid chromatography-mass spectrometry analysis is carried out after freeze-drying in vacuum.

The peptide segments are dissolved by liquid chromatography mobile phase A and separated by EASY NLC 1000 UPLC. Mobile phase A is an aqueous solution containing 0.1% formic acid and 2% acetonitrile; mobile phase B is an aqueous solution containing 0.1% formic acid and 90% acetonitrile. The condition is set as: 0-24 minutes, 10%-25% B; 24-32 minutes, 25%~36% B; 32-36 minutes, 36%~80% B; 36-40 minutes, 80% B, flow rate maintained at 350 nl/minutes.

The peptide segments are separated by UPLC and injected into NSI ion source for ionization, and then analyzed by Q Exactive Plus mass spectrometry. The ion source voltage is set at 2.0 kV, and the peptide parent ions and their secondary fragments are detected and analyzed by high-resolution Orbitrap. The scanning range of primary mass spectrometry is set to 350-1800 m/z, and the scanning resolution is set to 70000. The scanning range of secondary mass spectrometry is 100 m/z, and the scanning resolution of Orbitrap is set to 17,500. The data acquisition mode uses the data dependent scanning program, e.g., after the primary scanning, selecting the parent ions of the top 20 peptide segments with the highest signal intensity to enter the HCD collision pool in turn, using 30% of its power for fragmentation, and conducting secondary mass spectrometry analysis in turn. In order to improve the effective utilization of mass spectrometry, automatic gain control (AGC) is set to 5E4, the signal threshold is set to 5000 ions/s, the maximum injection time interval is set to 200 ms, and the dynamic exclusion time of tandem mass spectrometry scanning is set to 30 seconds to avoid repeated scanning of parent ions.

The secondary mass spectrometry data are retrieved by Maxquant (v1.5.2.8). Parameter setting are as follows: the database is UniProt *Zea mays* (99,368 sequences), adding a reversed library to calculate the false discovery rate (FDR) caused by random matching, and adding a common contaminated library to the database to eliminate the influence of contaminated proteins in the identification results. The enzyme digestion mode is set to trypsin/p. The number of missing bits is set to 2. The minimum length of the peptide segments is set to 7 amino acid residues. The maximum number of modifications for peptide segments is set to 5. The mass error tolerance of primary parent ions of First search and Main search are set to 20 ppm and 5 ppm respectively, and the mass error tolerance of secondary fragment ions is 0.02 Da. The variable modification is set to methionine oxidation, protein N-terminal acetylation, Iodo TMT-6plex var. The quantitative method is set as iodotmt-6plex, and the FDR for protein identification and PSM identification is set to 1%.

c. Analysis of Differential Protein

After the above operations, the present disclosure identified a series of differential proteins, and the quantity is shown in Table 2.

TABLE 2

Quantity of Different Protein in Each Group

|  | Quantifiable Protein | Differential Protein[1] | Intersection between Modified and Protein Group | Differential Intersection Protein[1] |
|---|---|---|---|---|
| Protein Group | 6769 | 260 | — | — |
| Protein Phosphorylation Group | 3106 | 1183 | 1888 | 787 |
| Crotonyl Group | 1763 | 101 | 1565 | 74 |
| Protein Oxidation Group | 1082 | 92 | 940 | 63 |

[1]Difference that is more than 1.3 times.

The differentially expressed genes and protein-coding genes with different levels of protein content, phosphorylation, crotonylation and oxidation are divided into 23 data sets, which represent up regulation of expression, down regulation of expression; up regulation of protein content, down regulation of protein content, up and down regulation of protein content; up regulation of phosphorylation level, down regulation of phosphorylation level, up and down regulation of phosphorylation level; up regulation of phosphorylation level relative to changes in protein content, down regulation of phosphorylation level relative to changes in protein content, up and down regulation of phosphorylation level relative to changes in protein content; up regulation of crotonylation level, down regulation of crotonylation level, up and down regulation of crotonylation level; up regulation of crotonylation level relative to changes in protein content, down regulation of crotonylation level relative to changes in protein content, up and down regulation of crotonylation level relative to changes in protein content; up regulation of oxidation level relative to changes in protein content, down regulation of oxidation level relative to changes in protein content, and up and down regulation of oxidation level relative to changes in protein content.

Fisher's test is used to detect the enrichment of the gene set of each differential regulation data in the gene set annotated by GO, MaizeCyC and Mapman to analyze the function of gene enrichment in each differential data set. The results showed that these 23 differentially regulated gene data sets significantly enriched ($P<0.05$) 1717 annotated gene sets, most of which can be divided into 11 functional groups, which are: reactive oxygen species (ROS), mitochondrial metabolism, cytoplasmic generation, cell wall, cytoskeleton, protein degradation, protein DNA restoration, protein translation, intimal system, cell signaling and lipid balance. Among them, reactive oxygen species can affect other functional groups or can be affected by them, and are located in the central position. This also suggested that there is a disturbance of reactive oxygen species in the pollen of mutant ZmPLA1. Therefore, the differential proteins identified in the 11 functional groups may potentially affect the reactive oxygen species level of pollen.

Superoxide radicals produced by cells are converted into peroxides under superoxide dismutase (SOD), and hydroxyl radicals are produced by Fenton reaction in the presence of iron ions. Hydroxyl radicals are the main substances that can attack DNA and produce hydroxyguanine (Poprac P, Jomova K, Simunkova M, et al. Targeting Free Radicals in Oxidative Stress-Related Human Diseases[J]. Trends Pharmacol Sci, 2017, 38(7): 592-607.). Therefore, reactive oxygen species are substances that can directly damage DNA. Using mononuclear sequencing to analyze the haploid induction line from maize Stock6, it is found that there is a high level of DNA breakage in its sperm cells (Li X, Meng D, Chen S, et al. Single Nucleus Sequencing Returns Spermatized Chromosomal Fragmentation as a Possible Cause of Maize Haploid Induction[j]. NAT commun, 2017, 8 (1): 991.). Therefore, it can be speculated that the process of haploid induction may be related to the increase of reactive oxygen species.

d. Verification of Haploid Induction Mechanism

In order to further verify that the disordered reactive oxygen species in pollen is the direct cause of DNA fragmentation and haploid induction in sperm cells, the present disclosure uses peroxidase-inhibitor methimazole (MMI) and ROS-induced reagent lecithin to treat pollen. DNA fragmentation (which is one of the characteristics of haploid) in the treated pollen is detected. Hydrogen peroxide is known to cause DNA breakage, which can be used as a positive control. The steps are as follows:

The pollen of maize at flowering stage is collected and treated in 87.6 mM of MMI (MMI dry powder dissolved in 40% sucrose solution), 0.0015% of hydrogen peroxide, 40% of sucrose solution and 0.3 mM of PC (PC dry powder dissolved in 40% sucrose solution) for 6 hours. Release sperm cells on the slide and separate a single sperm for amplified sequencing (Sigma WGA4 kit). Sequencing results showed that DNA fragmentation of sperm is detected and originated in the centromere region (FIG. 1). Compared with control group, a higher proportion of fragmentation is detected in the pollen treated with MMI, hydrogen peroxide and PC (Table 3). This result verified that ROS can lead to the fragmentation of DNA in reproductive cell, thus proving the key role of ROS in haploid induction.

TABLE 3

Fragmented Maize Cells in Different Reagents

|  | Pollen | | | Sperm Nucleus | | |
|---|---|---|---|---|---|---|
| Reagent | Total Cells | Fragmented Cells | Proportion | Total Cells | Fragmented Cells | Proportion |
| 87.6 mM MMI | 20 | 16 | 80% | 45 | 32 | 71% |
| Hydrogen Peroxide (0.0015%) | 19 | 15 | 79% | 44 | 26 | 59% |
| 0.3 mM PC | 19 | 13 | 68% | 18 | 10 | 56% |
| 40% Sucrose Solution | 17 | 10 | 59% | 38 | 14 | 37% |

Methimazole (MMI) is a commonly used antithyroid drug in clinic, which can inhibit the degradation of reactive oxygen species in cells. Lecithin from soybean (PC) can directly induce the production of reactive oxygen species. Together, MMI and PC can increase the level of reactive oxygen species (also referred to as reactive oxygen species level) in pollen, which in turn leads to the fragmentation of sperm DNA. Therefore, reagents with compounds that promote the level of reactive oxygen species in plant reproductive cells can induce the generation of haploids.

Example 2. Evaluation of Haploid Induction Rate of Maize with Different Reagents Tests of the induction efficiency of different concentrations of reagents including MMI and PC on maize haploid at two test sites in Zhangye, Gansu and Xishuangbanna, Yunnan were performed. Because maize pollen will burst due to high osmotic pressure after soaking in water, the paraffin oil was selected as the solvent to dissolve MMI and PC to maintain the physiological state and osmotic pressure of cells.

Pollen from different maize samples was treated with different concentrations of MMI/paraffin oil and PC/paraffin oil for 20 minutes. The chromosome ploidy was identified, and the haploid induction rate was calculated to evaluate the induction efficiency of maize haploid by different reagents. The steps are as follows:

a. Preparation of Four Reagents for Haploid Induction:

Reagent 1: MMI at 1/5 of the saturated concentration (<0.16 mg/ml): taking 0.02 g MMI and adding it to a 50 mL centrifuge tube, adding 25 ml of paraffin oil into the centrifuge tube, and shaking the centrifuge tube for 48 hours at 35° C.; after centrifugation, taking 5 ml of supernatant to a new 50 mL centrifuge tube, adding 20 ml of paraffin oil to the centrifuge tube, and then shaking the centrifuge tube for 10 hours at 35° C. until MMI is completely dissolved. Because 0.02 g of MMI cannot be completely dissolved in paraffin oil, so the true concentration of MMI at 1/5 of saturated concentration may be less than 0.16 mg/ml.

Reagent 2: PC at 4 mg/ml: taking 0.1 g of PC and adding it to a 50 ml centrifuge tube, adding 25 ml of paraffin oil into the centrifuge tube, and shake it for 48 hours at 35° C. until PC is completely dissolved.

Reagent 3: PC at 0.8 mg/mL: taking 0.02 g of PC and adding it to a 50 ml centrifuge tube, adding 25 ml of paraffin oil into the centrifuge tube, and shake it for 48 hours at 35° C. until PC is completely dissolved.

Reagent 4: Control: 25 ml of pure paraffin oil.

Note: MMI is methimazole, Production No. M106466, CAS No. 60-56-0 (Aladdin); PC is lecithin from soybean, Production No. 1105733, CAS No. 8002-43-5, (Aladdin).

b. Collecting an appropriate amount of maize pollen in the field, adding the reagents, and incubating for 20 minutes; avoiding direct sunlight and heating during the incubation, keeping the temperature below 20° C., and turning it upside down every 5 minutes.

c. Using a soft brush (such as a writing brush, a balance brush, etc.) to spread the treated pollen evenly on the filaments, avoiding the reagents to touch the cob, and bagging it. Chromosome ploidy is detected after seed maturation, and the haploid induction rates were evaluated. The results are shown in Table 4.

Haploid induction rate is affected by the environment of the test site, and there are differences between different maize materials. Generally, Reagent 1 is 0.16 mg/ml of MMI; Reagent 2 is 4 mg/ml of PC; Reagent 3 is 0.8 mg/ml of PC, they can induce haploid. Reagent 3 (0.8 mg/ml of PC) had the best haploid induction effect among the three reagents, and the induction rate can reach 17.2%. In addition, when maize pollen is treated with saturated MMI, the toxicity of MMI leaded to maize sterility, so it cannot be applied to haploid induction.

TABLE 4

Evaluation of haploid induction rate of Maize with different reagents

| Location | Reagent | Donor | Recipient | Total | Actual Quantity | Fruit Rate | Haploid Quantity | Induction Rate |
|---|---|---|---|---|---|---|---|---|
| Yunnan | 3 | C01 | C01 | 302 | 58 | 19.2% | 10 | 17.2% |
| Yunnan | 4 | C01 | C01 | 300 | 286 | 95.3% | 0 | 0% |
| Gansu | 1 | HCL645 | D1798Z | 52 | 32 | 61.5% | 2 | 6.3% |
| Gansu | 2 | HCL645 | D1798Z | 71 | 46 | 64.8% | 1 | 2.2% |
| Gansu | 3 | HCL645 | D1798Z | 55 | 26 | 47.3% | 2 | 7.7% |
| Gansu | 2 | PH4CV | PH6WC | 166 | 94 | 56.6% | 3 | 3.2% |
| Gansu | 4 | HCL645 | D1798Z | 121 | 108 | 89.3% | 0 | 0% |

Example 3. Efficient Method for Selecting Compounds of Haploid Induction

The level of reactive oxygen species is related to many biological pathways, such as cell signaling, cytoskeleton, metabolism, lipid balance, stress, and so on. Therefore, there are many chemicals that can affect the level of reactive oxygen species within cells. The chemicals that can lead to the increase of the level of reactive oxygen species in reproductive tissues of plants are also potential haploid-inducing reagents. Because the identification process of haploid is relatively complex, the selection and identification of new haploid-inducing reagent is expensive and time-consuming. However, the detection of reactive oxygen species level is relatively easy. Therefore, the relative reactive oxygen species level of in the reproductive tissues of plants is used to simply and efficiently select potential compounds of haploid-induction.

The present disclosure provides a method for selecting potential compounds of haploid induction through relative reactive oxygen species level, which includes:
transferring pollen into 15 ml of 40% sucrose solution, mixing it upside down to hydrate into a suspension;
transferring 200 μL of the pollen suspension to a 1.5 ml centrifuge tube, and adding 200 μL of 2× final concentration of reagents, which are prepared by dissolving compounds 1-26 listed in Table 5 in the 40% sucrose solution;
incubating the mixture at 20° C. for 30 minutes, and mixing it upside down every 5 minutes; and detecting the ROS level by using ROS detection kit (fluorometry, MAK144, sigma), which specifically includes:
adding 0.4 μL of ROS detection reagent to the mixture, mixing it for incubation for 30 minutes, and observing the result and taking a photo with a microscope.

The red channel or bright channel of the photo was analyzed, and the ROS level was represented by the light intensity of the wavelength with the largest proportion. The relative ROS level in a reproductive tissue refers to a ratio of the ROS level of the reproductive tissue to the ROS level in the control group (40% sucrose).

Taking maize pollen as an example, the experiment of a series of compounds that may affect the ROS level in the maize pollen was tested. The results indicated that the phatidyl choline-specific phospholipase C (PC-PLC) inhibitor: D609, choline phosphate CP, phospholipase D inhibitor: FIPI).

Figure 2:
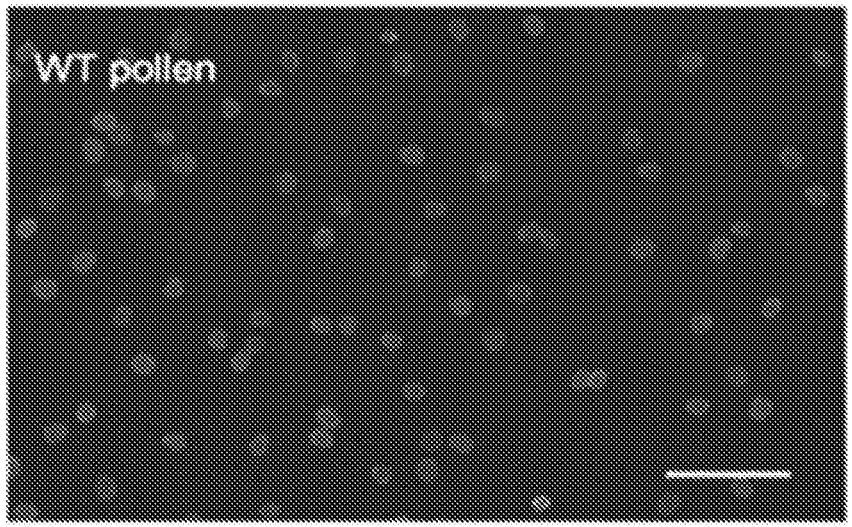
FIG. 2 illustrates the ROS level in untreated (above) and choline phosphate-treated (No. 14, below) pollen cells which are detected by citrus fluorometry; A: Fluorescent photos, B and C illustrate the brightness value and red-light value corresponding to each pixel of the photos. The horizontal axis corresponding to the peak value represents the color value corresponding to the most pixels of the picture, which can represent the fluorescence intensity of the cell (or ROS level).
Figure 2:
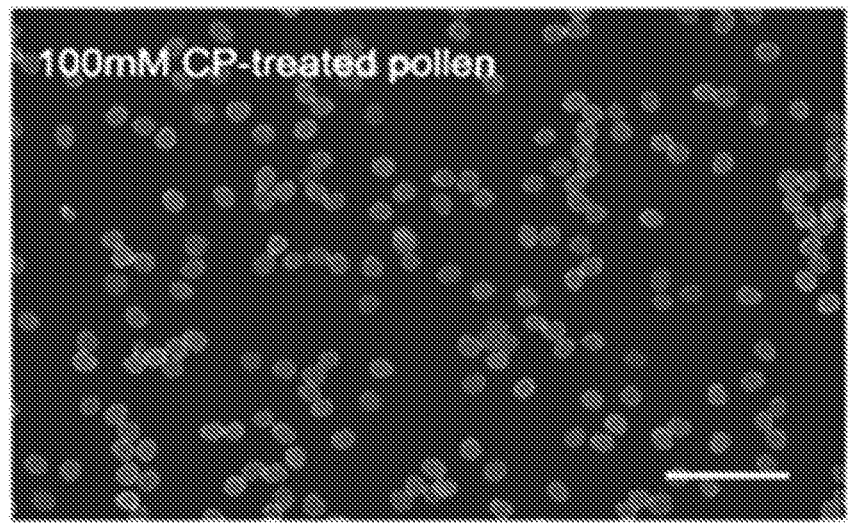
Figure 2:
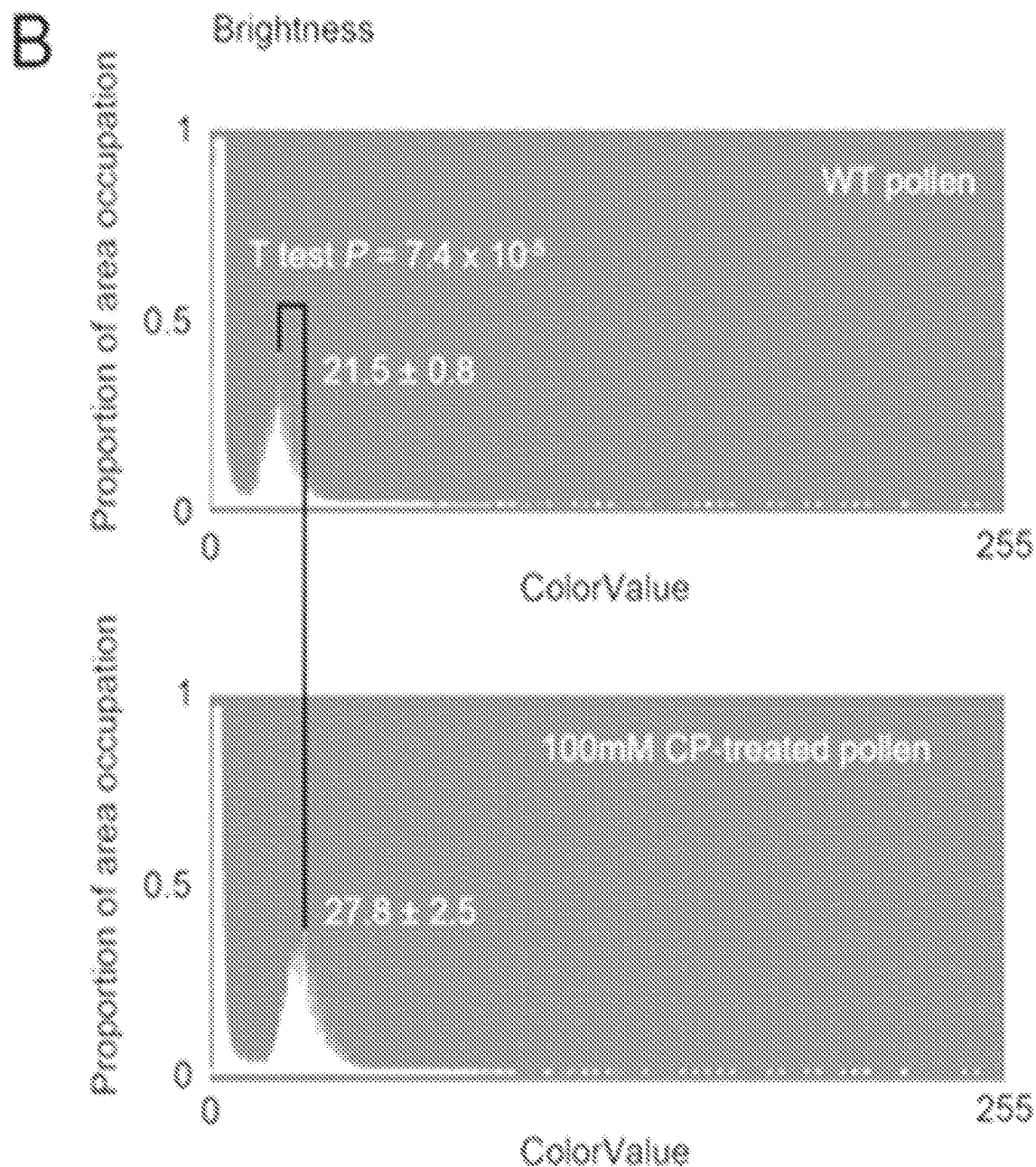
Figure 2:
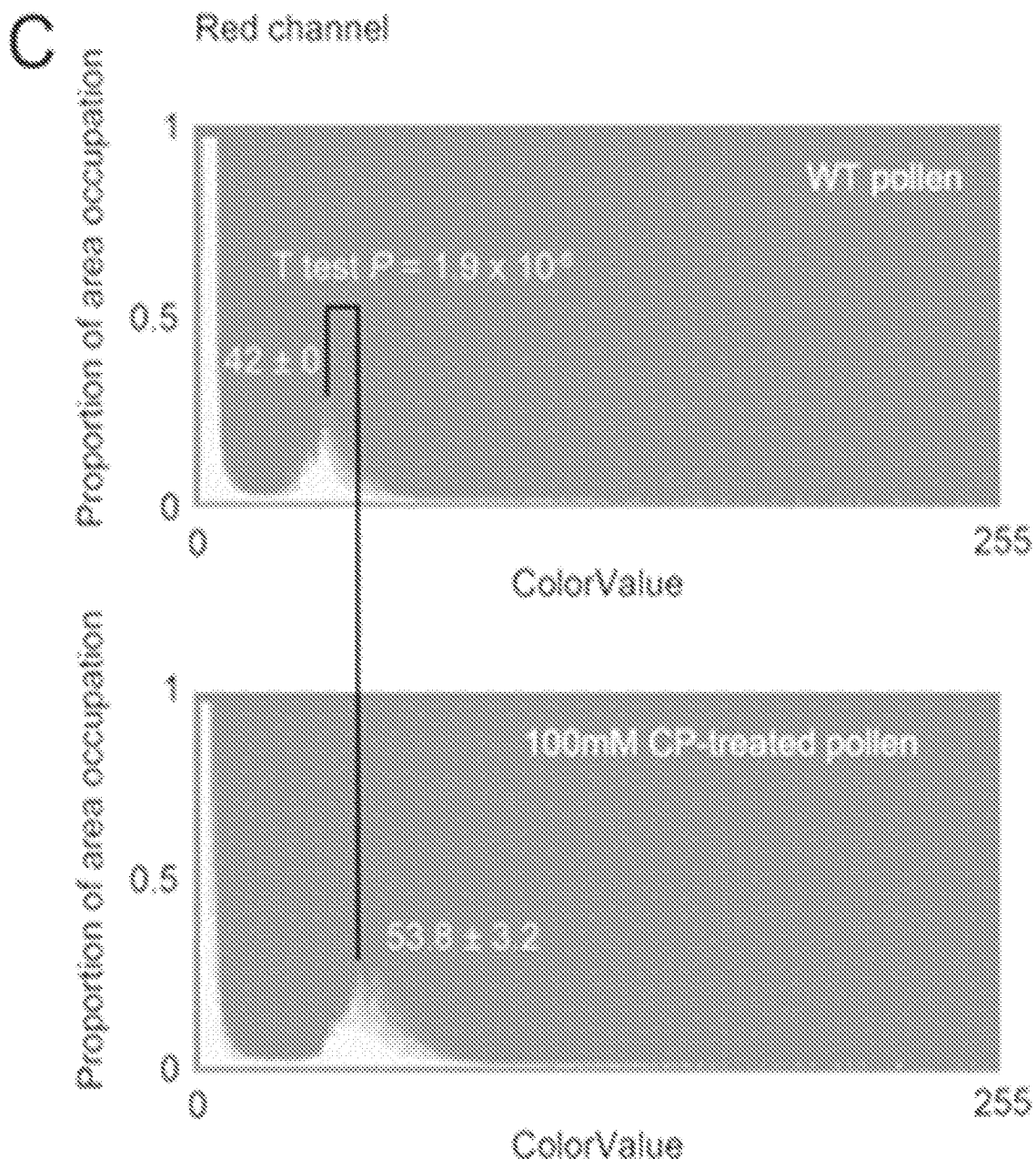

As shown in Table 5, compound 1, calcium chloride ($CaCl_2$), had the most obvious effect on the increase of ROS level. Compound 12 is methimazole (MMI) used in Example 2, but the solvent and concentration of the formulation are different. Compound 15 is the PC_18:1, which has the same polar group (choline), phosphate group and glycerol skeleton as the lecithin used in Example 2, but the fatty acid chains are different. FIG. 2 shows the fluorescent photos for detection of the ROS level after the treatment of maize pollen with compound 14 choline phosphate.

TABLE 5

Effects of Different Compounds on the Level of ROS in Maize Pollen

| No. | Compound | Final Concentrations | Manufacturer | Art. No. | Relative ROS Level Red | Bright |
|---|---|---|---|---|---|---|
| 1 | $CaCl_2$ | 1.83 mM | Sinopharm | — | 3.81 ± 0.21 | 4.03 ± 0.24 |
| 1 | $CaCl_2$ | 18.3 mM | Sinopharm | — | 3.01 ± 0.23 | 3.11 ± 0.23 |
| 2 | $Ca(NO_3)_2$ | 18.3 mM | Sinopharm | — | 2.97 ± 0.12 | 3.08 ± 0.12 |
| 2 | $Ca(NO_3)_2$ | 1.83 mM | Sinopharm | — | 2.55 ± 0.21 | 2.57 ± 0.15 |
| 3 | cAMP | 0.6 mM | Yuanye | B24342 | 1.97 ± 0.10 | 2.04 ± 0.15 |
| 4 | $IP_3(1,3,4)$ | 0.042 mM(20 ng/μL) | Avanti | 850113P | 1.39 ± 0.01 | 1.37 ± 0.00 |
| 5 | PI(4,5)PP_18:1 | 0.019 mM(20 ng/μL) | Avanti | 850155P | 1.05 ± 0.07 | 1.06 ± 0.06 |
| 6 | Jasplakinolide | 0.028 mM(20 ng/μL) | macklin | J863523 | 1.77 ± 0.16 | 1.79 ± 0.16 |
| 7 | Cucurbitacin E | 0.045 mM(25 ng/μL) | macklin | C860639 | 1.31 ± 0.08 | 1.37 ± 0.02 |
| 8 | Latrunculin B | 0.0126 mM(5 ng/μL) | SIGMA | 428020 | 1.66 ± 0.06 | 1.64 ± 0.10 |
| 9 | Latrunculin A | 0.004 mM(1.67 ng/μL) | SIGMA | L5163 | 1.35 ± 0.05 | 1.37 ± 0.04 |
| 10 | Blebbistatin | 0.086 mM(25 ng/μL) | MCE | HY-13441 | 1.35 ± 0.17 | 1.37 ± 0.14 |
| 11 | Diphenyl iodide chloride | 1/200 of Saturation Concentration | Aladdin | D113448 | 1.55 ± 0.13 | 1.53 ± 0.14 |
| 12 | Methimazole | 87.59 mM(10 μg/μL) | Aladdin | M106466 | 1.15 ± 0.14 | 1.12 ± 0.12 |
| 13 | FIPI | 0.06 mM(25 ng/μL) | MCE | HY-12807/ CS-4183 | 1.34 ± 0.07 | 1.35 ± 0.06 |
| 14 | CP | 100 mM | TCI | P0834 | 1.28 ± 0.08 | 1.27 ± 0.11 |
| 15 | PC_18:1 | 0.318 mM(250 ng/μL) | AVANTI | 850375P | 1.19 ± 0.17 | 1.21 ± 0.18 |
| 16 | D609 | 0.094 mM(25 ng/μL) | MCE | HY-70072/ CS-0078 | 1.14 ± 0.10 | 1.12 ± 0.10 |
| 0 | Control Group | 40% Sucrose (Sinopharm) | | | 1.00 ± 0.06 | 1.00 ± 0.09 |
| 17 | PI(3,5)PP_18:1 | 0.019 mM(20 ng/μL) | Avanti | 850154P | 0.88 ± 0.08 | 0.82 ± 0.11 |
| 18 | PI(4)P_18:1 | 0.020 mM(20 ng/μL) | Avanti | 850151P | 0.84 ± 0.08 | 0.82 ± 0.10 |
| 19 | PI(3)P_18:1 | 0.020 mM(20 ng/μL) | Avanti | 850150P | 0.63 ± 0.05 | 0.62 ± 0.06 |
| 20 | IP3(1,4,5) | 0.42 mM(200 ng/μL) | Avanti | 850115P | 0.67 ± 0.03 | 0.60 ± 0.02 |
| 21 | Citric acid | 10 mM | Sinopharm | — | 0.78 ± 0.02 | 0.74 ± 0.06 |
| 22 | PS_18:1 | 0.309 mM(250 ng/μL) | Avanti | 840035P | 0.63 ± 0.05 | 0.65 ± 0.02 |
| 23 | PE_18:1 | 0.336 mM(250 ng/μL) | Avanti | 850725P | 0.98 ± 0.04 | 0.92 ± 0.08 |
| 24 | PI_18:1 | 0.023 mM(20 ng/μL) | Avanti | 850149P | 0.88 ± 0.06 | 0.81 ± 0.05 |
| 25 | PA_18:1 | 0.346 mM(250 ng/μL) | Avanti | 840875P | 0.34 ± 0.01 | 0.33 ± 0.02 |
| 26 | PG_18:1 | 0.314 mM(250 ng/μL) | Avanti | 840475P | 0.33 ± 0.00 | 0.32 ± 0.00 | reagents including compounds 1-16 increased the relative ROS level in maize pollen and are used as candidate compounds for maize haploid induction. The results are shown in Table 5.

Those compounds are chose from: inhibitors of enzymes related to the reactive oxygen species degradation pathway (such as peroxidase inhibitor: methimazole), reactive oxygen-induced compounds (such as diphenyleneiodonium chloride, DPI), compounds related to signal pathways (such as calcium chloride $CaCl_2$), calcium nitrate $Ca(NO_3)_2$, cyclic Adenosine Monophosphate Camp (cAMP), inositol triphosphate ($IP_3(1,3,4)$), 1,2-Octadecyl Phosphatidylinositol Di-4,5-Phosphate (PI(4,5) PP_18:1)), compounds related to cytoskeleton stability (such as Jasplakinolide, Cucurbitacin E, Latrunculin B, Latrunculin A, blebbistatin), compounds related to lecithin balance (such as PC_18:1, phos- All reagents are dissolved in 40% sucrose. The relative ROS levels were from 6-7 measurements.

The methods described in Example 2 or similar methods can further be used to evaluate and verify the haploid induction rate of maize, cotton, rice, rape, sorghum, wheat, citrus and other plants by using the reagents prepared from compounds 1-16.

Example 4 Evaluation of Haploid Induction Rate of Rape by Reagent Containing PC

Pollen of rape cultivar S45 was treated with a reagent containing PC to test the haploid induction rate. The specific experiment steps include:

weighing PC, adding PC to 20% sucrose solution for incubation at 37° C. for 30 min, mixing the solution by inversion to make the reagent containing PC at 0.1 mg/ml;

taking the pollen of rape cultivar S45, putting the pollen into a 2 ml centrifuge tube, adding 2 ml of the reagent containing PC to the 2 ml centrifuge tube for incubation at room temperature for 30 min and invertion every 10 min;

sucking out the pollen, transferring the pollen to absorbent paper, and drying the pollen at room temperature;

pollinating the pollen after being dried, and pollinating the pollen again after 24 hours of the first pollination;

obtaining the immature seeds by taking silique after 20 days of the second pollination; and stripping the reproductive tissues of the seeds and identifying the chromosome ploidy by flow cytometry.

The identification results showed that 2 of 48 seeds of the rape were haploid, with a haploid induction rate of 4.17%.

Example 5 Evaluation of Haploid Induction Rate of Cotton by Reagent Containing PC Pollen of cotton cultivar TM-1 was treated with a reagent containing PC to test the haploid induction rate. The specific experiment steps include:

weighing PC, adding PC to 40% sucrose solution for incubation at 37° C. for 30 min, mixing the solution by inversion to make the reagent containing PC at 0.2 mg/mL;

taking the pollen of cotton cultivar TM-1, putting the pollen into a 2 ml centrifuge tube, adding 2 ml of the reagent containing PC to the 2 ml centrifuge tube for incubation at room temperature for 30 min and invertion every 10 min;

sucking out the pollen, transferring the pollen to absorbent paper, and drying the pollen at room temperature;

pollinating the pollen after being dried, and pollinating the pollen again after 24 hours of the first pollination;

obtaining the immature seeds by taking bolls after 30 days of the second pollination; and stripping the reproductive tissues of the seeds and identifying the chromosome ploidy by flow cytometry.

The identification results showed that 3 of 95 seeds of the cotton were haploid, with a haploid induction rate of 3.16%.

Example 6 Evaluation of Haploid Induction Rate of Citrus by Reagent Containing PC Pollen of citrus cultivar, *Fortunella hindsii* Swingle, was treated with a reagent containing PC to test the haploid induction rate. The specific experiment steps include:

weighing PC, adding PC to 30% sucrose solution for incubation at 37° C. for 30 min, mixing the solution by inversion to make the reagent containing PC at 0.05-0.2 mg/mL;

taking the pollen of the citrus, putting the pollen into a 2 ml centrifuge tube, adding 2 ml of the reagent containing PC to the 2 ml centrifuge tube for incubation at room temperature for 30 min and invertion every 10 min;

sucking out the pollen, transferring the pollen to absorbent paper, and drying the pollen at room temperature;

pollinating the pollen after being dried, and pollinating the pollen again after 24 hours of the first pollination;

obtaining the immature seeds by taking fruit after 30 days of the second pollination; and stripping the reproductive tissues of the seeds and identifying the chromosome ploidy by flow cytometry.

The identification results showed that 2 of 72 citrus seeds were haploid, with a haploid induction rate of 2.77%.

All of the compositions and methods disclosed and claimed herein can be made and executed without undue experimentation in light of the present disclosure. While the compositions and methods of the present disclosure have been described in terms of the foregoing illustrative embodiments, it will be apparent to those of skill in the art that variations, changes, modifications, and alterations may be applied to the composition, methods, and in the steps or in the sequence of steps of the methods described herein, without departing from the true concept, spirit, and scope of the present disclosure. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope, and concept of the present disclosure as defined by the appended claims.

What is claimed is:

1. A method for inducing haploid seed production using a reagent that comprises a compound, wherein the compound is lecithin from soybean and with CAS No. 8002-43-5, comprising:
   (a) dissolving or emulsifying the compound into the reagent; and
   (b) treating a reproductive tissue of a plant with the haploid-inducing reagent, wherein the treatment occurs immediately preceding, during or immediately following pollination, and at least one haploid seed is produced,
   wherein the haploid induction ability of the compound results from an increase of a reactive oxygen species (ROS) level in a reproductive tissue of a plant caused by the compound, thereby increasing the haploid-induction rate compared to control seeds that are not treated with the reagent.

2. The method according to claim 1, wherein the reagent comprises paraffin oil or 20%-40% sucrose solution.

3. The method according to claim 2, comprising dissolving the lecithin in the reagent at a concentration of 0.05-5 mg/ml.

4. The method according to claim 2, comprising dissolving the lecithin in the reagent at a concentration of 0.8-4 mg/ml.

5. The method according to claim 2, comprising dissolving the lecithin in the reagent at a concentration of 0.8 mg/ml.

6. The method according to claim 1, wherein the plant includes at least one of maize, cotton, rice, rape, sorghum, wheat, and citrus.

7. The method according to claim 1, wherein the plant is maize.

8. The method according to claim 1, comprising dissolving the lecithin on a shaking incubator at 35° C. for 48 hours.

9. The method according to claim 1, wherein the compound at 0.8 mg/ml achieves a haploid-induction rate larger than 7%.

10. The method according to claim 9, wherein the compound at 0.8 mg/ml achieves a haploid-induction rate of 7.7%.

11. The method according to claim 9, wherein the compound at 0.8 mg/ml achieves a haploid-induction rate of 17.2%.

* * * * *